United States Patent [19]

Gordy et al.

[11] 4,215,239

[45] Jul. 29, 1980

[54] APPARATUS FOR THE ACQUISITION OF A CARRIER FREQUENCY AND SYMBOL TIMING LOCK

[75] Inventors: Robert S. Gordy, Largo; David E. Sanders, St. Petersburg, both of Fla.

[73] Assignee: E-Systems, Inc., Dallas, Tex.

[21] Appl. No.: 857,754

[22] Filed: Dec. 5, 1977

[51] Int. Cl.² ............................................. H04B 1/66
[52] U.S. Cl. ..................................... 375/114; 375/119; 375/77; 370/100
[58] Field of Search .................... 179/15 BS; 328/155; 325/4, 58, 321, 329, 330; 178/69.1

[56] References Cited

U.S. PATENT DOCUMENTS

| | | | |
|---|---|---|---|
| 3,124,751 | 3/1964 | Gery | 325/419 |
| 3,204,185 | 8/1965 | Robinson | 325/419 |
| 3,206,681 | 9/1965 | Brown | 325/321 |
| 3,311,828 | 3/1967 | Chasek | 325/49 |
| 3,462,551 | 8/1969 | Fong | 178/69.1 |
| 3,594,651 | 7/1971 | Wolejsza | 329/104 |
| 3,600,699 | 8/1971 | Orenberg | 331/2 |
| 3,648,173 | 3/1972 | Elliott | 325/58 |
| 3,766,482 | 10/1973 | Brown, Jr. et al. | 325/419 |
| 3,769,602 | 10/1973 | Griswold | 329/122 |
| 3,883,806 | 5/1975 | De Long et al. | 325/320 |
| 3,906,376 | 9/1975 | Bass | 329/104 |
| 3,921,076 | 11/1975 | Currie | 325/321 |
| 3,958,083 | 5/1976 | Hara et al. | 179/15 BS |
| 4,039,749 | 8/1977 | Gordy et al. | 178/69.1 |
| 4,048,563 | 9/1977 | Osborne | 178/69.1 |

*Primary Examiner*—Benedict V. Safourek
*Attorney, Agent, or Firm*—Robert V. Wilder; Albert M. Crowder, Jr.

[57] ABSTRACT

Acquisition of a carrier frequency lock and a symbol timing lock is efficiently achieved during the preamble of a data signal in a time division multiple access communication system by first operating the system in an acquisition mode and subsequently switching to a data recovery mode. In the acquisition mode, an input signal is passed through a transversal correlator and frequency multiplied by a factor of two. The multiplied signal is used to control a local oscillator for demodulating the carrier signal. Also in the acquisition mode, the output of the transversal correlator is envelope detected and applied to a symbol timing loop that produces a symbol timing signal. Upon the detection of a symbol timing lock, a lock detector switches the system to the data recovery mode. In the data recovery mode, the input signal is frequency multiplied by 4 and used to control the local oscillator for demodulating the input signal. The demodulated input signal is now applied to the symbol timing loop to maintain a symbol timing lock condition.

12 Claims, 5 Drawing Figures

APPARATUS FOR THE ACQUISITION OF A CARRIER FREQUENCY AND SYMBOL TIMING LOCK

This invention relates to data communications, and more particularly to a more efficient apparatus for the acquisition of a carrier frequency lock and a symbol timing lock in a time division multiple access communications system.

A worldwide communication system has been established utilizing orbiting artificial earth satellites as transmitting stations. These satellites are orbiting at a distance above the earth and at such spaced apart distances such that one satellite is available for communication from or to any one place on earth for a reasonable amount of time. Each of the satellites of this system receives and transmits data signals at established modulation carrier frequencies.

With this additional expansion of the data communications field there has developed a need for transmitting and receiving equipment sophisticated enough to meet the technical requirements of the communications system. One such sophisticated communications system is known as a "Time Division Multiple Access" communication system which handles information bits at high repetition rates. To allow the necessary channels, this communication system uses quadraphase signal keying (QPSK) modulation to conserve bandwidth.

Quadraphase modulation techniques are particularly suitable in communication systems carrying large quantities of data. In transmitting bit streams between locations, the quadraphase modulation technique results in a symbol rate which is one-half the bit rate thereby reducing the bandwidth necessary to carry the information. Included in this bit rate is a data preamble comprising alternating ONES and ZEROES. To further enhance the amount of data transmit using quadraphase modulation techniques, it is necessary to achieve synchronous communications within the very short preamble, which characteristically is eighty (80) symbols. Thus, for high speed data communication it is desirable to achieve a carrier phase lock and symbol timing lock within the eighty symbols of the preamble while operating at an energy per information bit per noise density of 1.5 db and without experiencing a significant signal-to-noise degradation.

Heretofore, to lock onto a carrier frequency the quadraphase suppressed carrier signal frequency was multiplied by four resulting in an unmodulated frequency component of four times the carrier frequency. This component was applied to a balanced mixer having an output connected to a loop filter for driving a voltage controlled oscillator. The output of the voltage controlled oscillator was the second input to the balanced mixer. This phase locked loop configuration locks to four times the carrier frequency signal with the carrier frequency generated at the output of a divide-by-four circuit. With this type of system for carrier frequency acquisition there resulted an unacceptable signal-to-noise degradation. While in theory an adaptive loop filter could be used, such use relies on a knowledge that the loop is locked. However, the signal-to-noise ratio would be too low to successfully operate a lock detector in the allowed time of eighty symbols in the data preamble. In such conventional systems as heretofore utilized, the symbol timing loop follows a similar configuration.

In accordance with the present invention, there is provided apparatus for the acquisition of a carrier frequency and a symbol timing lock during a data preamble. Such apparatus includes a carrier recovery loop responsive to an input signal including the data preamble. A symbol timing loop is also connected to the carrier recovery loop and responds to an envelope of the input signal including the data preamble. As part of the symbol timing loop there is included means for detecting a symbol timing lock and this means generates a control signal upon the detection of a lock condition. A series of controllers responds to the control signal to switch the carrier recovery loop and the symbol timing loop from an acquisition mode operational during the data preamble to a data recovery mode responsive to data bits of the input signal.

For a more complete understanding of the present invention and advantages thereof, reference is now made to the following description taken in conjunction with the following drawings.

Referring to the drawings.

Figure 1:
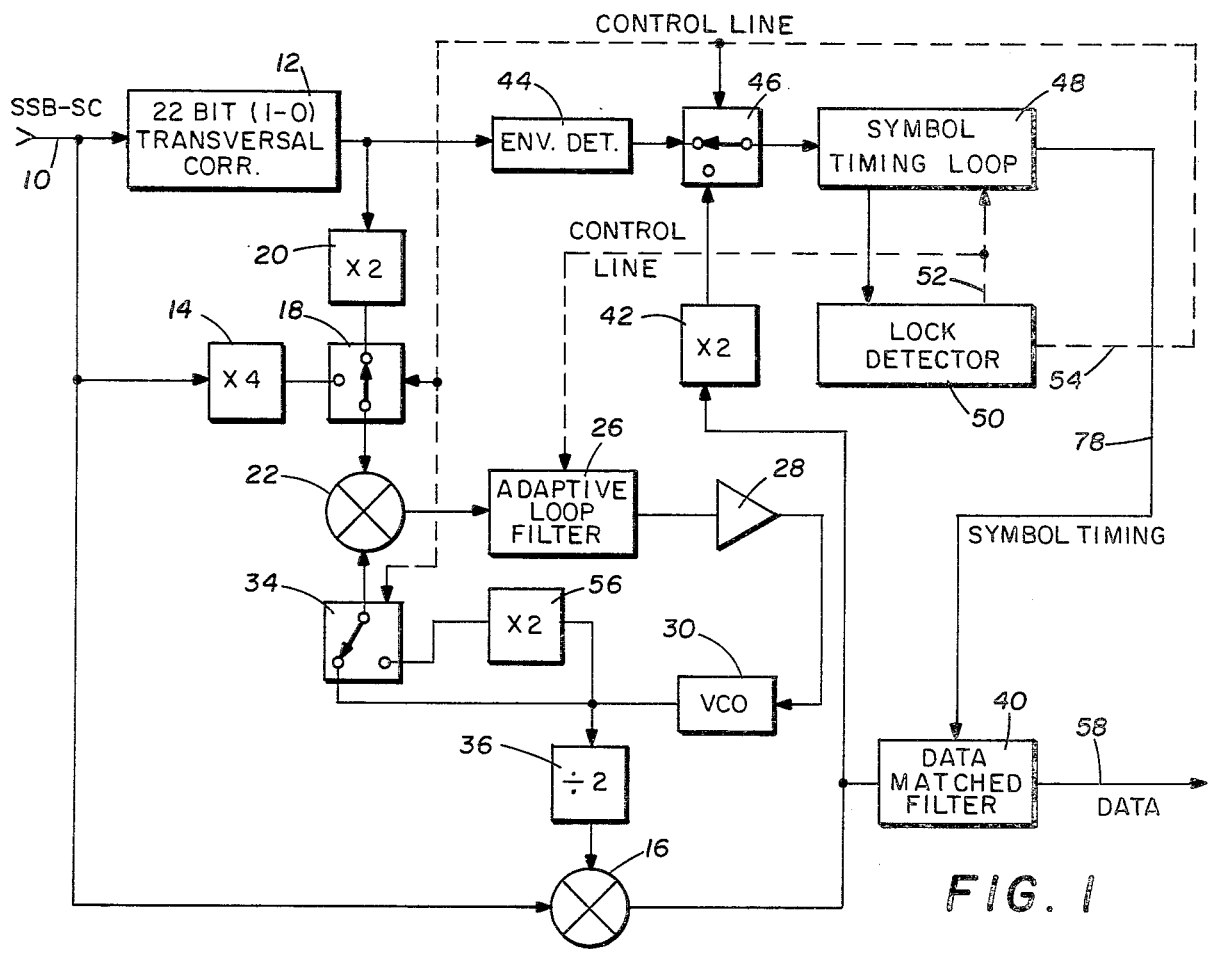
FIG. 1 is a general block diagram of apparatus for acquiring a carrier frequency lock and for a symbol bit timing lock.

Referring to FIG. 1, a double sideband suppressed carrier data signal having a center frequency $f_c$ is transmitted over a line 10 to the input of a transversal correlator 12, a times four multiplier 14, and a balanced mixer 16. Initially, the system of FIG. 1 is in an acquisition mode and the output of the frequency multiplier 14 is dead ended at the open contact of a two position switch 18. In the acquisition mode the output of the transversal correlator 12 is applied to a two times frequency multiplier 20 that is coupled through the two position switch 18 through a balanced mixer 22.

Referring to FIG. 2A, the waveform 24 illustrates a typical output of the transversal correlator 12 that includes a carrier frequency envelope and the modulated data signal. At each crossover of the waveform 24 there is a phase reversal of the carrier frequency. This is the signal that is applied to the frequency multiplier 20 that produces an output at twice the carrier frequency with no phase reversal.

At the output of the balanced mixer 22 there appears a signal at twice the carrier frequency during the acquisition mode and this is input to an adaptive loop filter 26 that is switchable between a wide bandwidth and a narrow bandwidth configuration. In the acquisition mode as presently being described, the adaptive loop filter 26 is in the wide bandwidth configuration and generates an output applied through an amplifier 28 to the input of a voltage controlled oscillator 30. Typically, the signal at the output of the amplifier 28 varies in magnitude with the difference in phase between the two inputs to the balanced mixer 22, and this signal is illustrated by the waveform 32 of FIG. 2B.

In the acquisition mode, an output of the voltage controlled oscillator 30 is applied through a two position switch 34 as the second input to the balanced mixer 22. As configured, the output of the voltage controlled oscillator is twice the carrier frequency to achieve a carrier frequency lock. The phase lock loop including the balanced mixer 22, adaptive filter 26 and the voltage controlled oscillator 30 functions to lock on to the carrier frequency during the acquisition mode.

Also connected to the output of the voltage controlled oscillator 30 is a divide-by-2 frequency divider 36 that outputs a signal at the carrier frequency applied as a second input to the balanced mixer 16. As part of the balanced mixer 16 there is included a pulse shaping network such that the output waveform of the mixer is given by the waveform 38 of FIG. 2. This signal is applied to an input of a data matched filter 40 and also to a times two frequency multiplier 42 as part of a symbol timing loop, to be described.

Figure 2:
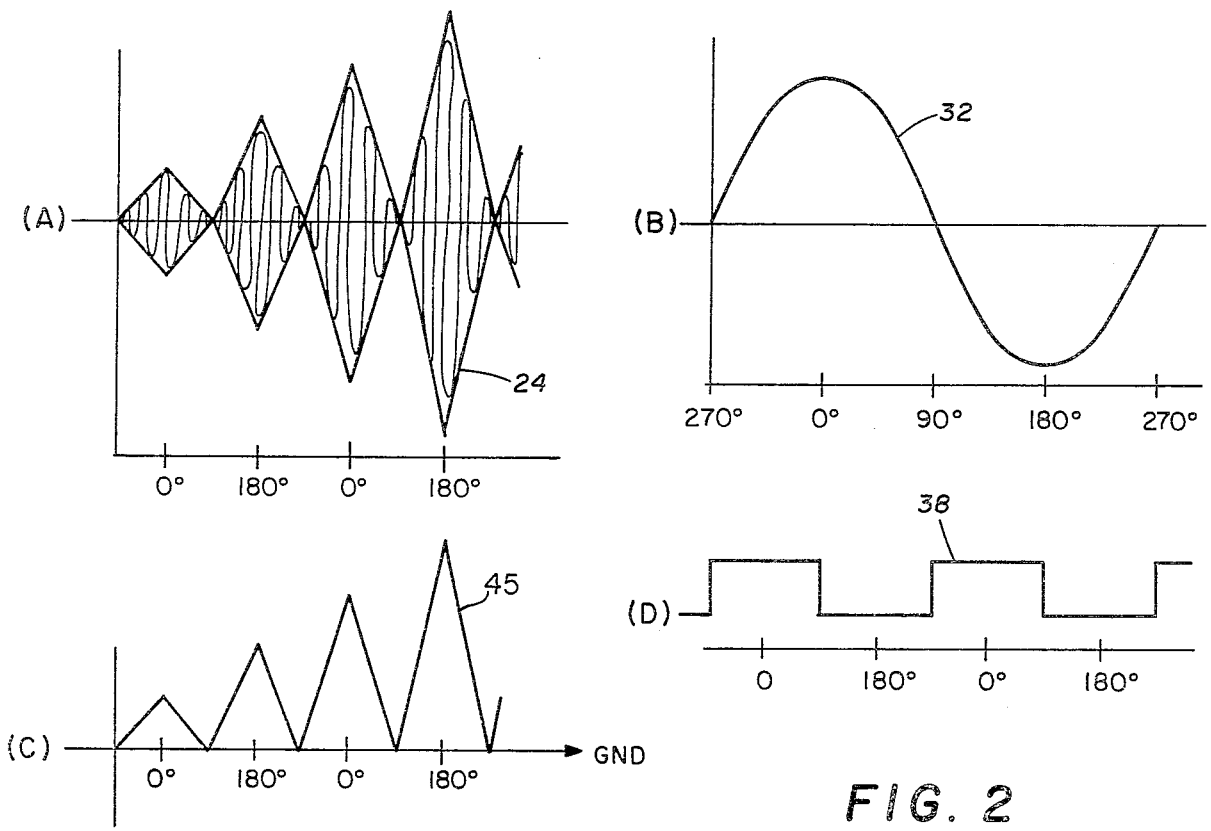
FIG. 2 is a sequence of waveforms illustrating the operation of the apparatus of FIG. 1.

In addition to the two times frequency multiplier 20, also connected to the output of the transversal correlator 12 is an envelope detector 44 that produces an output as given by the waveform 45 of FIG. 2 applied through a two position switch 46 to a symbol timing loop 48. The symbol timing loop, to be described in greater detail, generates a lock signal through a lock detector 50 and also produces symbol timing pulses to the data matched filter 40. The lock signal to the detector 50 is generated when the symbol timing loop 48 locks on to the symbol timing bits in the preamble of the data signal on the line 10. This takes place during the acquisition mode, and when the lock signal is applied to the lock detector 50 it generates control signals on control lines 52 and 54 to switch the system from the acquisition mode to the data lock mode.

In the data lock mode, the two position switches 18, 34 and 36 are switched to the normally open contacts. At this time the transversal correlator 12 is disconnected from both the carrier frequency loop and the symbol timing loop at the switches 18 and 46. The times four frequency multiplier 14 is now coupled to the balanced mixer 22 and the times two multiplier 42 is coupled to the symbol timing loop 48. Thus, in this second mode, that is, the data lock mode of operation, the balanced mixer 22 receives an input signal at four times the carrier frequency of the suppressed carrier signal on the line 10. Again, there is no phase reversal of this signal and the output of the balanced mixer 22 is now applied to the adaptive loop filter 26. The control signal on the line 52 has switched the loop filter 26 to the narrow band configuration and the output of the amplifier 28 drives the voltage controlled oscillator 30. At this time, the switch 34 has been changed to the second position thereby coupling into the carrier frequency loop a two times frequency multiplier 56. This doubles the frequency at the output of the voltage controlled oscillator 30 to apply to the second input of the balanced mixer 22 a signal at four times the carrier frequency. The loop including the filter 26, voltage controlled oscillator 30, times two multiplier 56 and the balanced mixer 22 now maintains a frequency carrier lock.

The output of the voltage controlled oscillator 30 is also applied through the divider 36 to one input of the balanced mixer 16, as described previously in the acquisition mode. However, the output of the balanced mixer 16 is now applied through the multiplier 42 to the symbol timing loop 28 to maintain a symbol timing lock. So long as a lock condition exists, and such a condition should exist unless a malfunction occurs, the lock detector 50 maintains the system in the data mode of operation.

With the system in the data mode, the output of the balanced mixer 16, which is now the data signal, is input to the data matched filter 40. The data matched filter 40 operates to minimize the noise interference on the input signal and generates a data signal on an output line 58 having an improved signal-to-noise ratio and an energy per information bit per noise density in the range of 1.5 db.

Figure 3:
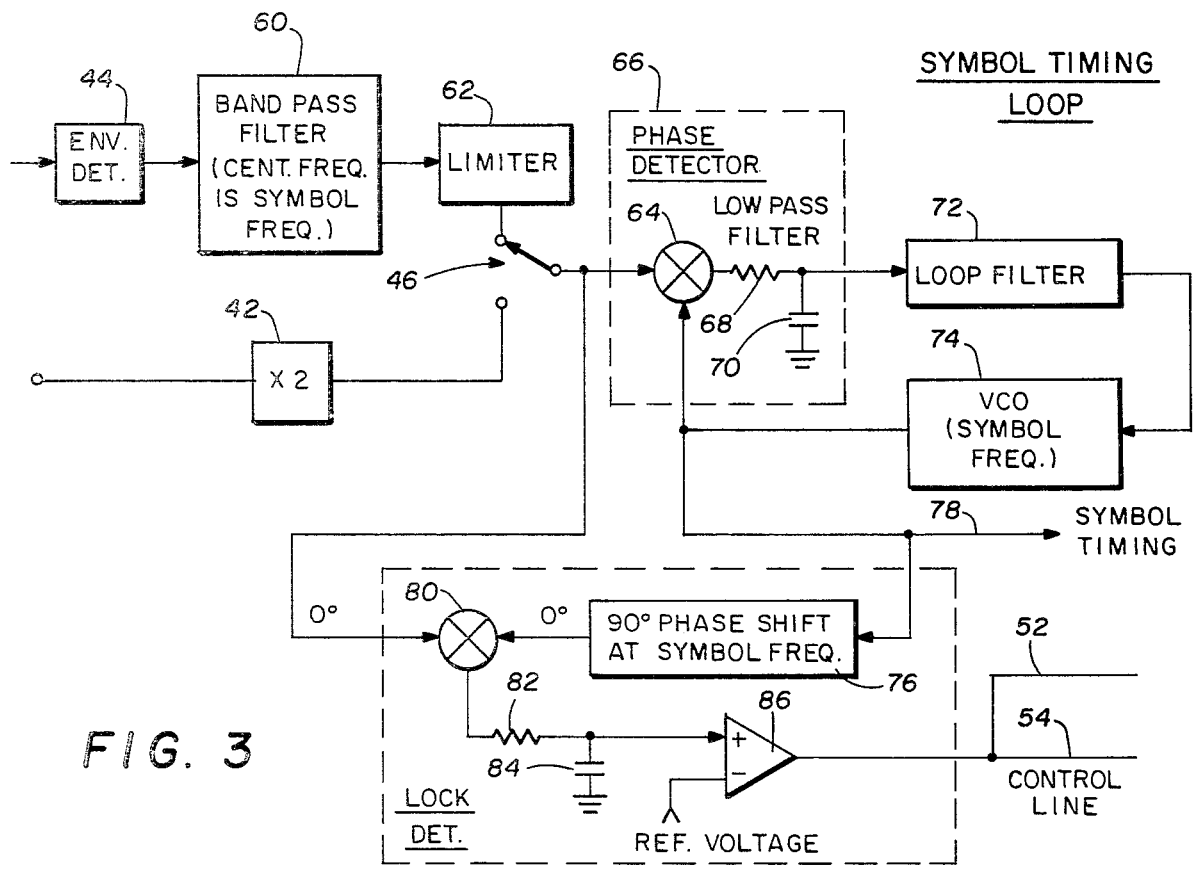
FIG. 3 is a detailed block diagram, partially in schematic, of the symbol timing loop and lock detector of FIG. 1.

Referring to FIG. 3, there is shown an expanded block diagram of the symbol timing loop 48 wherein the output of the envelope detector 44 is applied to a bandpass filter 60 having a bandwidth center at the frequency of the symbol bits. After passing through the filter 60, the symbol timing bits are applied to a limiter 62 that has an output connected to the two position switch 46. From the two position switch 46 the symbol timing bits are applied to a summing junction 64 of a phase detector 66 that also includes a low pass filter consisting of a resistor 68 and a capacitor 70.

At the interconnection of the resistor 68 and the capacitor 70 a phase error signal is generated that is applied to a loop filter 72 having an output driving a voltage controlled oscillator 74. The voltage controlled oscillator 74 generates an output at the symbol frequency which is applied as a second input to the summing junction 64. This output of the voltage controlled oscillator 74 is also applied to a ninety degrees phase shift circuit 76 and is the symbol timing signal applied to the data matched filter 40 on the line 78.

At the output of the phase shift network 76 a signal at the symbol frequency is compared with the signal at the alternate position of switch 46 and the difference applied to a pulse shaping network consisting of a resistor 82 and a capacitor 84 interconnected to the positive input terminal of the differential amplifier 86. The negative terminal of the amplifier 86 is tied to a reference voltage and the output is the control signal on the lines 52 and 54.

As configured, the symbol timing loop compares the signal at the switch 46 and the output of the voltage controlled oscillator 74 at the ninety degrees position. The mixer 80, on the other hand, provides a comparison between the signal at the switch 46 and the output of the phase shift network 76 at the zero degrees signal position. This output of the mixer 80 is then compared with the threshold level established by the reference voltage applied to the amplifier 86. When the output of the mixer 80 is at the threshold level, the amplifier generates the control voltages on the lines 52 and 54 to change the position of the switches 14, 34 and 46.

When the position of the switch 46 is changed the signal applied to the mixers 64 and 80 is the output of the times two frequency multiplier 42 as explained with reference to FIG. 1. The loop including the mixer 64, filter 72 and voltage controlled oscillator 74 locks on the symbol frequency and generates the symbol timing signal on the line 78 to be applied to the data matched filter 40.

Figure 4:
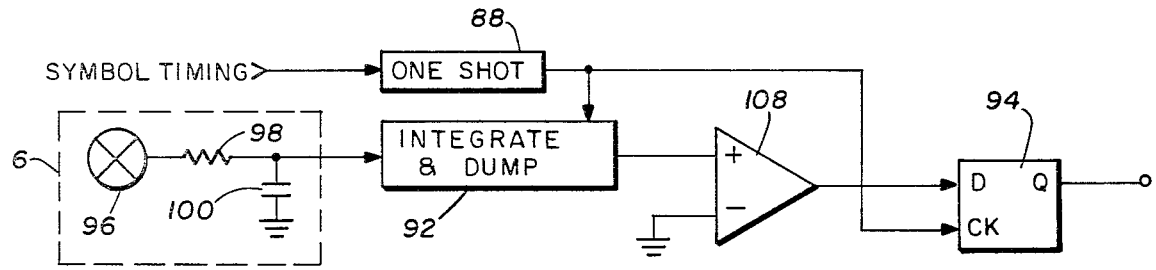
FIG. 4 is an expanded block diagram of the data match filter of FIG. 1.
Figure 5:
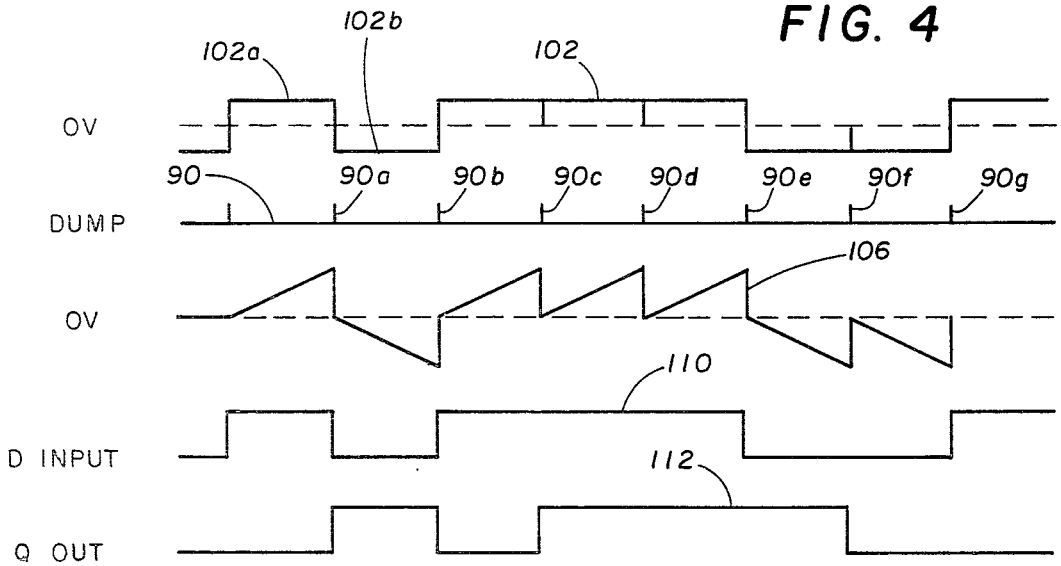
FIG. 5 is a sequence of waveforms illustrating the operation of the data match filter of FIG. 4.

Referring to FIG. 4, there is shown an expanded block diagram of the data matched filter 40 wherein the symbol timing signal is applied to a one shot multivibrator 88 having an output in the form of a pulse train as given by the waveform 90 of FIG. 5. This pulse train is connected to an integrate and dump circuit 92 and the clock terminal of a flip-flop 94.

Applied to the input of the integrate and dump circuit 92 is the output of the balanced mixer 16, here shown as consisting of a signal junction 96, a resistor 98 and a capacitor 100. The signal generated at the interconnection of the resistor 98 and the capacitor 100, which is also connected to the frequency multiplier 42, is shown by the waveform 102 of FIG. 5. In the integrate and dump circuit 92 this signal is integrated over the interval between the timing pulses from the one shot multivibrator 88.

The output of the integrate and dump circuit 92 is illustrated by the waveform 104 which shows integration from a zero volt level along a ramp until the occurrence of the next timing signal from the one shot multivibrator 88. For the pulse 102*a* of the waveform 102 the output of the circuit 92 is a positive going ramp which continues until the occurrence of the timing pulse 90*a*. The next pulse of the waveform 102, pulse 102*b*, has a negative going value causing an output from the circuit 92 to integrate in a negative direction until the occurrence of the timing pulse 90*b*. For the next three timing intervals defined by pulses 90*c*, 90*d* and 90*e*, a sawtooth waveform is generated at the output of the circuit 92. A similar negative going sawtooth waveform is generated between the timing intervals as defined by the pulses 90*f* and 90*g*.

An output from the circuit 92 is applied to a comparator 108 that generates an output applied to the D-terminal of the flip-flop 94. The signal output from the amplifier 108 follows substantially the input to the integrate and dump circuit 92. However, by operation of the integrate and dump circuit 92 and the amplifier 108, a significant improvement in the signal-to-noise ratio is achieved. The signal as applied to the D-terminal of the flip-flop 94 is given by the waveform 110 which is clocked through the flip-flop to produce at the Q-terminal an output as illustrated by the waveform 112. The signal at the output of the flip-flop 94 exhibits a further improvement in the signal-to-noise ratio and is the data signal for further processing in a communications system.

An improvement in the signal-to-noise ratio between the input on the line 10 and the output of the flip-flop 94 is achieved by operating the carrier frequency loop and the symbol timing loop first in an acquisition mode and then switching to a data recovery mode. The initial lock on the carrier frequency and the symbol timing is achieved in the preamble of the data signal which may typically be eighty symbols of an alternating logic ONE and logic ZERO code. This achieves synchronous communication using a relatively short preamble to a data code. Further, the system allows acquisition and lock on at a relatively low signal-to-noise ratio.

While only one embodiment of the invention, together with modifications thereof, has been described in detail herein and shown in the accompanying drawings, it will be evident that various further modifications are possible without departing from the scope of the invention.

What is claimed is:

1. Apparatus for the acquisition of a carrier frequency and symbol timing lock, comprising in combination:
   carrier recovery means operable in an acquisition mode and data recovery mode and being responsive to an input signal including data bits, a data preamble with symbol timing bits in the data preamble for generating an output frequency locked to the carrier frequency,
   symbol timing means operable in an acquisition mode and a data recovery mode and being connected to said carrier recovery means for generating a symbol timing signal that is locked in synchronism with the symbol timing bits of the data preamble, said symbol timing means being responsive in the acquisition mode to an envelope of the input signal to generate the symbol timing signal,
   means for detecting a symbol timing lock between the symbol timing signal and the symbol timing bits of the data preamble and for generating a control signal in response thereto, and
   control means responsive to the control signal for switching said carrier recovery means and said symbol timing means from the acquisition mode to the data recovery mode.

2. Apparatus for the acquisition of a carrier frequency and symbol timing lock as set forth in claim 1 further including a transversal correlator having an output connected in the acquisition mode to said carrier recovery means and said symbol timing means and having an input terminal connected to receive the input signal, and further including means for disconnecting said carrier recovery means and said symbol timing means from the output of the transversal correlator in the data recovery mode.

3. Apparatus for the acquisition of a carrier frequency and symbol timing lock as set forth in claim 2 wherein said control means includes means for shifting the carrier recovery means from the output of said transversal correlator to a signal at a multiple of the carrier frequency when said carrier recovery means is switched from the acquisition mode to the data recovery mode.

4. Apparatus for the acquisition of a carrier frequency and symbol timing lock as set forth in claim 1 wherein said symbol timing means includes means responsive to the demodulated input signal in the data recovery mode for generating the symbol timing signal.

5. Apparatus for the acquisition of a carrier frequency and symbol timing lock as set forth in claim 4 including means responsive to a frequency signal from the carrier recovery means, the symbol timing signal from the symbol timing means and the input signal for generating an enhanced data signal.

6. Apparatus for the acquisition of a carrier frequency and symbol timing lock, comprising in combination:
   first means for multiplying responsive to an input signal for generating an output at a multiple of the carrier frequency of the input signal,
   second means for multiplying responsive to the input signal for generating an output at a second multiple of the carrier frequency,
   switching means having an output switchable between said first and second means,
   means for combining the frequency signal at the output of the switching means with a feedback signal having an adjustable frequency,
   a carrier recovery loop responsive to the output of said means for combining to generate the feedback signal to the means for combining,
   symbol timing means responsive to an envelope of the input signal and generating a frequency signal at a lock condition,
   means responsive to the frequency signal of the symbol timing means generating a control signal, and
   control means responsive to the control signal for actuating said switching means from the first means to the second means and said symbol timing means from an acquisition mode to a data recovery mode.

7. Apparatus for the acquisition of a carrier frequency and symbol timing lock as set forth in claim 6 wherein said carrier frequency loop includes an adaptive filter switchable by the control signal from a wide band configuration in the acquisition mode to a narrow band configuration in a data recovery mode.

8. Apparatus for the acquisition of a carrier frequency and symbol timing lock as set forth in claim 7 including a voltage controlled oscillator responsive to the output of said adaptive filter and generating an output as the feedback signal to said means for combining at a multiple of the carrier frequency.

9. Apparatus for the acquisition of a carrier frequency and symbol timing lock as set forth in claim 8 wherein said carrier recovery loop includes means for multiplying the output of the voltage controlled oscillator by a fixed factor for generating an output frequency to be combined with the output of said second means for multiplying.

10. Apparatus for the acquisition of a carrier frequency and symbol timing lock as set forth in claim 9 wherein said carrier recovery loop further includes means responsive to the control signal for switching between the output of the voltage controlled oscillator and the output of the means for multiplying for applying to the means for combining.

11. Apparatus for the acquisition of a carrier frequency and symbol timing lock, comprising in in combination:

carrier recovery means responsive to an input signal including a data preamble, data bits and symbol timing bits in the data preamble and generating an output frequency locked to the carrier frequency, symbol timing means connected to said carrier recovery means and responsive to the envelope of the input signal and including means for generating a symbol timing signal locked in synchronism with the symbol timing bits in the data preamble and means for generating a frequency signal when the symbol timing signal locks in synchronism, means responsive to the frequency signal for generating a control signal, control means responsive to the control signal for switching said carrier recovery means and said symbol timing means from an acquisition mode to a data recovery mode, means for combining the output of the carrier recovery means with the input signal and generating an output varying therewith, and a data matched filter responsive to the output of said means for combining and the symbol timing signal for generating an enhanced data signal.

12. Apparatus for the acquisition of a carrier frequency and symbol timing lock as set forth in claim 11 wherein said symbol timing means includes means for switching from the envelope of the input signal to the output of said means for combining.

* * * * *